(12) United States Patent
Östman et al.

(10) Patent No.: US 7,586,865 B2
(45) Date of Patent: Sep. 8, 2009

(54) ALLOCATING POWER WHEN SIMULTANEOUSLY SENDING MULTIPLE MESSAGES

(75) Inventors: Leif Thomas Östman, Spånga (SE); Jan Pettersson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 583 days.

(21) Appl. No.: 11/472,552

(22) Filed: Jun. 22, 2006

(65) Prior Publication Data

US 2007/0298824 A1    Dec. 27, 2007

(51) Int. Cl.
*H04B 7/185* (2006.01)
(52) U.S. Cl. .................. 370/318; 370/320; 370/328; 370/342; 370/230; 455/522; 455/13.4; 455/127.5; 713/320
(58) Field of Classification Search .............. 370/318, 370/230, 320, 328, 329, 330, 335, 342; 455/522, 455/13.4, 15, 69, 127.1–127.5; 713/300, 713/320
See application file for complete search history.

(56) References Cited

U.S. PATENT DOCUMENTS

| 6,931,053 | B2 | 8/2005 | McGowan |
| 7,391,747 | B2 * | 6/2008 | Li ........................ 370/318 |
| 2005/0202818 | A1 * | 9/2005 | Hondo et al. ............ 455/434 |

2006/0008015 A1    1/2006  Marsili

FOREIGN PATENT DOCUMENTS

| WO | WO 99/53625 | 10/1999 |
| WO | WO 2007/149027 | 12/2007 |

OTHER PUBLICATIONS

International Search Report and Written Opinion of the International Searching Authority for International Application No. PCT/SE2006/050360 dated Jun. 7, 2007.
"*3rd Generation Partnership Project; Technical Specification Group Radio Access Network; Physical channels and mapping of transport channels onto physical channels (FDD) (Release 7),*" 3GPP TS 25.211 V7.0.0 (Mar. 2003) pp. 1-49.

* cited by examiner

*Primary Examiner*—Matthew D Anderson
*Assistant Examiner*—Shaima Q Aminzay
(74) *Attorney, Agent, or Firm*—Nixon & Vanderhye P.C.

(57) ABSTRACT

A base station receives multiple first signals from multiple mobile terminals over a first radio channel (e.g., a RACH, a CPCH, etc.). Multiple acknowledgement signals are generated for transmission over an acquisition indication channel (AICH) during a same access time slot. Each acknowledgement signal is responsive to one of the mobile terminals and includes a signature sequence of bits associated with the first signal received from that mobile terminal. An AICH transmission power profile is determined for the access time slot. If the AICH transmission power profile exceeds a predetermined maximum transmission power parameter, then a first portion of the an AICH transmission power profile is adjusted. Thereafter, the acknowledgement signals are transmitted over the AICH in accordance with the adjusted AICH transmission power profile.

16 Claims, 4 Drawing Sheets

ALLOCATING POWER WHEN SIMULTANEOUSLY SENDING MULTIPLE MESSAGES

TECHNICAL FIELD

The technical field relates to mobile radio communications, and more particularly, to power control of transmissions over radio channels.

BACKGROUND

In mobile radio communications, a variety of different type radio channels may be used to convey different types of information. For example, radio channels may be defined as control signaling channels or traffic channels, or they may be characterized as dedicated or common/shared channels. In third generation (3G), wideband code division multiple access (WCDMA) cellular communications systems, the physical radio channels are categorized in many ways: primary common control physical channel, secondary common control physical channel, physical random access channel, dedicated physical data channel, dedicated physical control channel, physical downlink shared channel, physical common packet channel, synchronization channel, common pilot channel, acquisition indication channel, paging indication channel, etc.

The random access channel (RACH) is used to register mobile terminals after power-on to the radio access network or to perform location update after moving form one location area to another or to initiate a call. But the RACH is also used by mobile terminals to send user data at a relatively low data rate. A RACH transmission from a mobile terminal includes a preamble with signature sequence of 16 symbols. The mobile terminal randomly selects one of plural RACH subchannels from a group the mobile terminal's access class allows it to use and randomly selects one of a group of available predetermined signature sequences. When a base station detects the RACH preamble and the selected signature sequence from the mobile terminal, the base station transmits an acknowledgement of the signature sequence over an acquisition indication channel (AICH) by sending back the same signature sequence as it received from the mobile terminal. Up to 16 signatures may be acknowledged on the AICH at the same time. To detect the AICH acknowledgement, the mobile terminal must of course "hear" the AICH and then obtain a phase reference from the common pilot channel of that base station. Because the AICH also needs to be heard by all mobile terminals, the AICH messages must be transmitted at high power. In case the mobile terminal does not receive an AICH, the mobile terminal increases the preamble transmission power by a step value given by the base station and retransmits the preamble on the RACH in the next available RACH access slot. A similar AICH acknowledgement procedure is performed between the base station and mobile terminals and the common packet channel (CPCH).

The AICH indication messages are transmitted at high power without power control. This can be a problem particularly when there is a heavy load on the random access channel, e.g., a large number of mobile users are leaving an athletic stadium and are making calls at the same time from the same general location. In that kind of situation, there may be a large number of acquisition indications transmitted by the base station during the same access time slot. For a given set of symbol/bit values in the signature sequences, there may be a number of symbol/bit values, which when "constructively" combined and transmitted, require a power output at the base station power amplifier that exceeds a preset maximum power. If that power maximum is exceeded because of the "constructive" power levels generated when multiple signature sequences are transmitted at or close to the same time, negative consequences can occur including damage to the base station power amplifier, distortion of the transmitted signature sequence, and generation of excessive interference in the base station coverage area.

One way to avoid these problems is to only permit the base station to send a maximum number of AICH messages at the same time. This approach may be satisfactory when the load on the RACH/AICH is low to moderate. But at higher loads, this approach does not provide the performance that may be expected or even necessary for certain applications and/or services supported by existing and future mobile communications networks for the base station to send a large number of AICH signals during the same access time slot. One example source of higher loads on the RACH/AICH channel is the Mobile Broadcast Service (MBS).

SUMMARY

These and other problems are overcome by controlling how power is allocated across a radio channel power profile when multiple messages are transmitted over that channel from the base station during the same time period. Initially, the base station receives multiple first signals from multiple mobile terminals over a first radio channel. The base station then generates multiple second signals for transmission over a second radio channel during the same time period. Each second signal is responsive to one of the mobile terminal first signals and includes a sequence of bits associated with that mobile terminal. The sequences of bits for the multiple mobile terminals are combined to generate a total value for one or more first bit positions in the sequences. If the total value for the one or more first bit positions exceeds a predetermined maximum transmission power parameter, then a transmission power level associated with the one or more first bit positions is selectively adjusted. One non-limiting way to make that adjustment is to change a weighting applied to the transmission power level associated with the one or more first bit positions in the sequences. Thereafter, the second signals are transmitted over a second radio channel.

In a preferred example embodiment, a transmission power level associated with one or more second bit positions in the sequences is increased. But if the total value for the one or more second bit positions in the sequences exceeds the predetermined maximum transmission power parameter, then a transmission power level associated with the one or more second bit positions in the sequences is reduced. A transmission power level associated with one or more third bit positions in the sequences is then increased, and so on.

Each sequence of bits may correspond to a signature sequence of bits. If the second radio channel is an acquisition indication channel (AICH), then the second signals are acquisition indication signals acknowledging the first signals. The signature sequence of bits for each mobile terminal is then determined based on a signature sequence received from that mobile terminal over a RACH, a CPCH, etc.

In a non-limiting example application, a base station receives multiple first signals from multiple mobile terminals over a random access channel (RACH). Multiple RACH acknowledgement signals are generated for transmission over the acquisition indication channel (AICH) during a same AICH access time slot. Each acknowledgement signal is responsive to one of the mobile terminals and includes a signature sequence of bits associated with the RACH signal received from that mobile terminal. An AICH transmission power profile based on a combination of all of the signal sequences is determined for the access time slot. If some part of the AICH transmission power profile exceeds a predetermined maximum transmission power parameter, then a first portion of the AICH transmission power profile is adjusted. Thereafter, the acknowledgement signals are transmitted over the AICH radio channel in accordance with the adjusted AICH transmission power profile.

Typically, the adjustment is to limit or reduce the power level of that one portion. But in order to increase the probability of the mobile terminals accurately receiving the AICH signature sequences, a second portion of the AICH transmission power profile is increased before transmitting the acknowledgement signals over the AICH radio channel in accordance with the adjusted AICH transmission power profile. If the AICH transmission power profile then exceeds a predetermined maximum transmission power parameter because of the power increase at that second portion, then a power level of the second portion of the AICH transmission power profile is decreased. In that case, a power level associated with a third portion of the AICH transmission power profile is increased. This process may be repeated.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
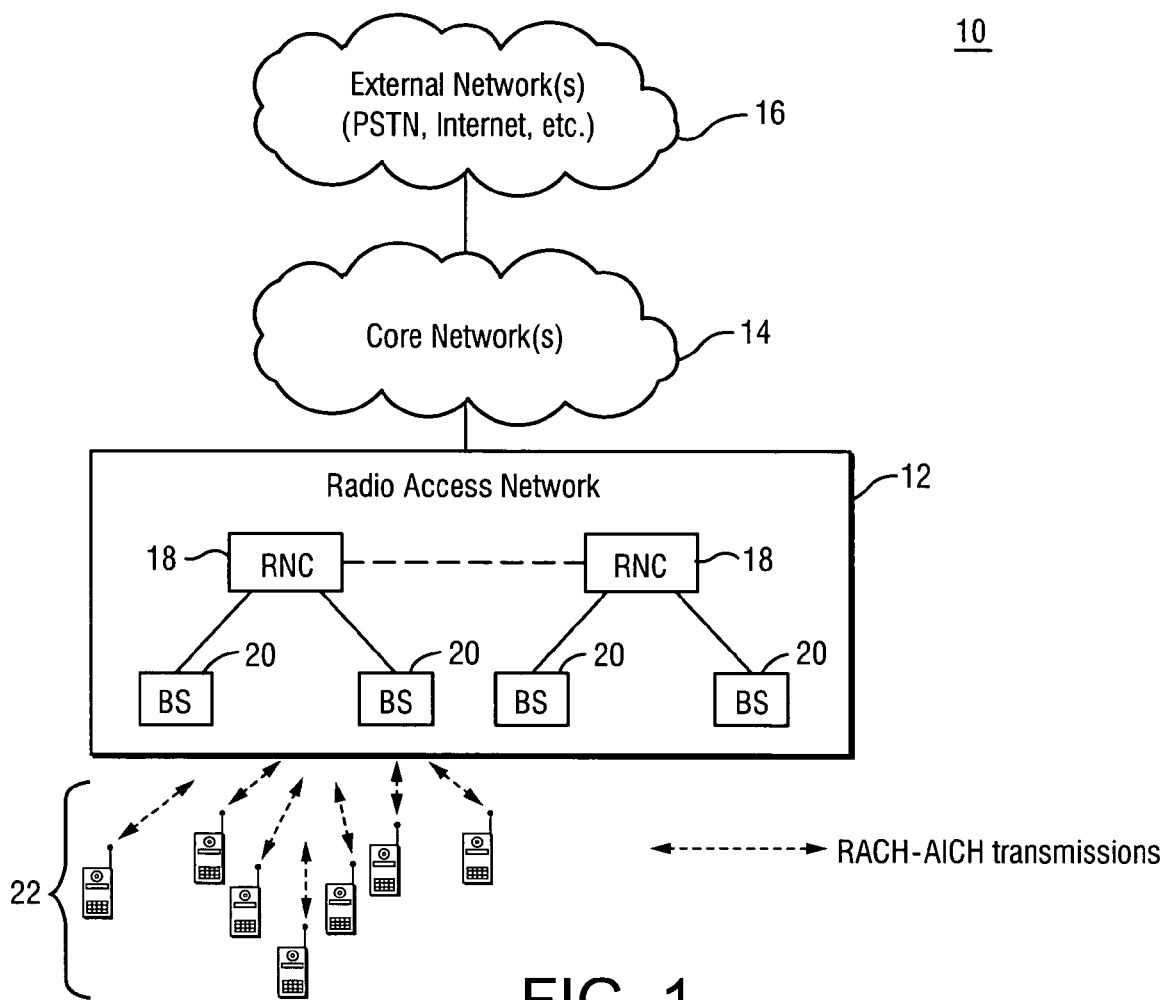
FIG. 1 is a high level representation of a mobile communications network.

FIG. 1 illustrates an example representation of a mobile communications network 10. A radio access network (RAN) 12 is coupled to one or more core networks 14, which in turn, are coupled to one or more external networks 16, like the Internet, the PSTN, ISDN, etc. The radio access network 12 includes, for example, one or more radio network controllers (RNCs) 18 that may communicate signaling and/or traffic to each other. Each RNC 18 controls one or more radio base stations (BSs) 20. Each base station 20 transmits information over an "air" interface in one or more corresponding coverage areas called cells over a variety of downlink radio channels. Each bases station 20 also receives uplink communications over the air interface from mobile terminals (22) in or near the base station's cell(s) again using one or more uplink channels. Mobile terminals are often referred to as mobile stations, mobile radios, and user equipment and include, for example, cell phones, PDAs, laptop computers, and other wireless communication devices. FIG. 1 also shows conceptually RACH transmissions from multiple mobile terminals 22 to one base station 20, and multiple acknowledgement signals broadcast from that base station over an acquisition indication channel (AICH) as explained in the background.

Although the following description focuses on AICH acknowledgements to RACH transmissions in the context of a 3G type radio network, the technology is not limited to this situation (or to a 3G network for that matter). The technology can be applied to any radio transmission in which multiple overlapping signals must be transmitted at or close to the same time such that the total transmission power for that time exceeds a predetermined maximum. For example, another application might be acknowledgements sent to mobiles via the AICH in response to uplink transmissions on the common packet channel (CPCH).

Figure 2:
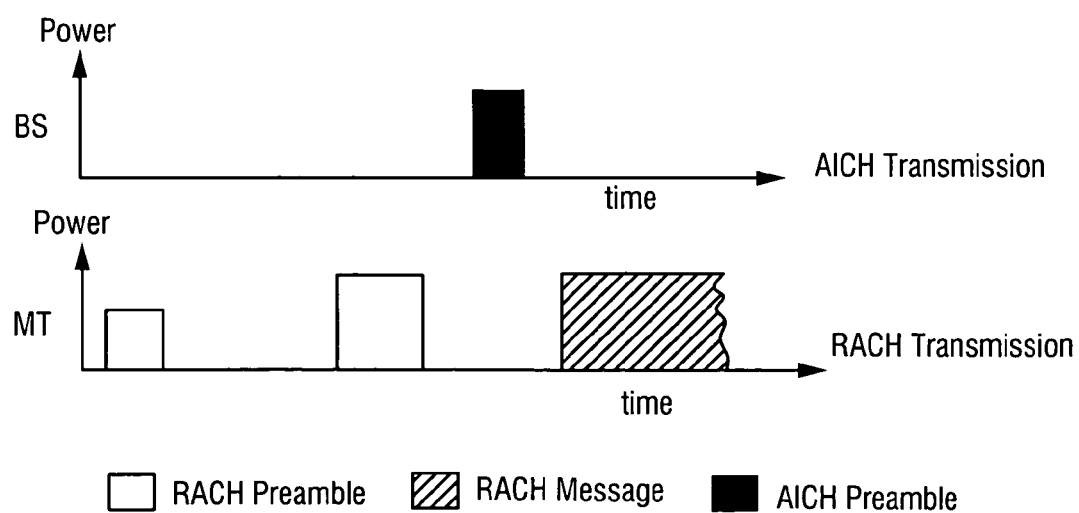
FIG. 2 is a diagram that illustrates conceptually the relationship between RACH and AICH transmissions.

FIG. 2 illustrates a mobile terminal (MT) sending a preamble signal over the RACH at increasing power levels. The first RACH transmission is at a sufficiently low first power level that the base station does not respond to it with an AICH acknowledgement. The mobile terminal sends a second RACH transmission at a second higher power level. This time the base station receives it and sends an acknowledgement AICH preamble over the AICH parroting the RACH preamble for that mobile terminal. After receiving the AICH preamble, the subsequent RACH messages are transmitted over the RACH at the second power level.

Figure 3:
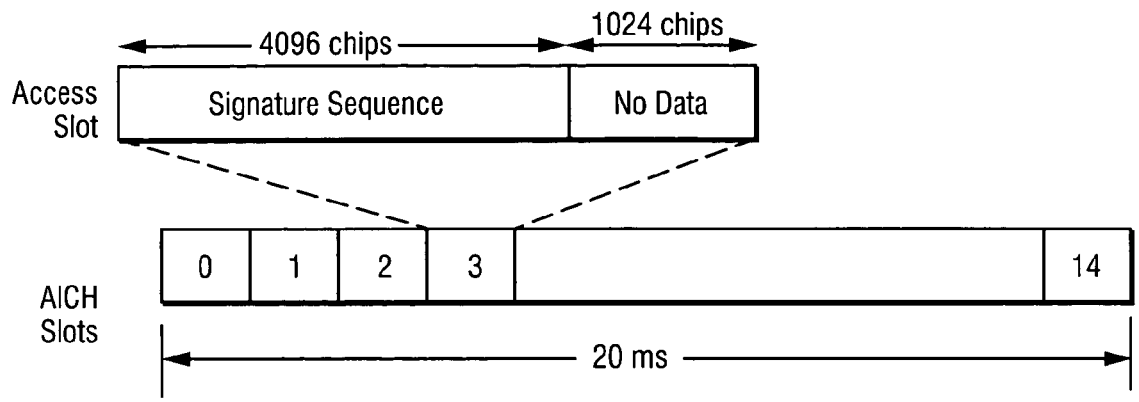
FIG. 3 is a diagram that illustrates 15 AICH access slots and shows details of one access slot.

As explained in the background, to generate a RACH preamble in a 3G system, the mobile terminal randomly selects one of 16 different RACH signature symbol or bit sequences. When the base station successfully receives and decodes the RACH preamble, it generates an AICH acknowledgement message that includes that same RACH signature sequence. FIG. 3 illustrates an example AICH signal format. There are 15 AICH access time slots in one 20 msec time frame. Each access time slot includes a signature sequence of 4096 chips long (the 3G system being a CDMA spread spectrum type of access system) along with 1024 chips that are not currently used to send information.

When there is a high load on the random access channel, many simultaneous RACH requests from mobile terminals in the same cell (e.g., after a sporting or other large event), there is a good chance that the base station for that cell will have to send a large number of acquisition indications over the AICH during the same access time slot in the downlink. This might not be a problem if the total power level of some of the AICH transmissions during that access time slot did not constructively add to create a greater transmission power level than permitted or otherwise desired. For example, if the signature sequence pattern of AICH channel has a "1" in the first 2 bits for every signature simultaneously transmitted, those bit values sum together to a large enough value that the power required from the power amplifier in the base station to transmit that combined value is too high.

Consider this illustrative example of AICH signature patterns described in TS 25.211 3GPP Release 5.7 reproduced below.

TABLE 1

AICH signature patterns

| S | $b_{s,0}, b_{s,1} \ldots, b_{s,31}$ | | | | | | | | | | | | | | | |
|---|---|---|---|---|---|---|---|---|---|---|---|---|---|---|---|---|
| 0  | 1  | 1  | 1  | 1  | 1  | 1  | 1  | 1  | 1  | 1  | 1  | 1  | 1  | 1  | 1  | 1  |
| 1  | 1  | 1  | -1 | -1 | 1  | 1  | -1 | -1 | 1  | 1  | -1 | -1 | 1  | 1  | -1 | -1 |
| 2  | 1  | 1  | 1  | 1  | -1 | -1 | -1 | -1 | 1  | 1  | 1  | 1  | -1 | -1 | -1 | -1 |
| 3  | 1  | 1  | -1 | -1 | -1 | -1 | 1  | 1  | 1  | 1  | -1 | -1 | -1 | -1 | 1  | 1  |
| 4  | 1  | 1  | 1  | 1  | 1  | 1  | 1  | 1  | -1 | -1 | -1 | -1 | -1 | -1 | -1 | -1 |
| 5  | 1  | 1  | -1 | -1 | 1  | 1  | -1 | -1 | -1 | -1 | 1  | 1  | -1 | -1 | 1  | 1  |
| 6  | 1  | 1  | 1  | 1  | -1 | -1 | -1 | -1 | -1 | -1 | -1 | -1 | 1  | 1  | 1  | 1  |
| 7  | 1  | 1  | -1 | -1 | -1 | -1 | 1  | 1  | -1 | -1 | 1  | 1  | 1  | 1  | -1 | -1 |
| 8  | 1  | 1  | 1  | 1  | 1  | 1  | 1  | 1  | 1  | 1  | 1  | 1  | 1  | 1  | -1 | -1 |
| 9  | 1  | 1  | -1 | -1 | 1  | 1  | -1 | -1 | 1  | 1  | -1 | -1 | 1  | 1  | -1 | -1 |
| 10 | 1  | 1  | 1  | 1  | -1 | -1 | -1 | -1 | 1  | 1  | 1  | 1  | -1 | -1 | -1 | -1 |
| 11 | 1  | 1  | -1 | -1 | -1 | -1 | 1  | 1  | 1  | 1  | -1 | -1 | -1 | -1 | 1  | -1 |
| 12 | 1  | 1  | 1  | 1  | 1  | 1  | 1  | 1  | -1 | -1 | -1 | -1 | -1 | -1 | -1 | -1 |
| 13 | 1  | 1  | -1 | -1 | 1  | 1  | -1 | -1 | -1 | -1 | 1  | 1  | -1 | -1 | 1  | -1 |
| 14 | 1  | 1  | 1  | 1  | -1 | -1 | -1 | -1 | -1 | -1 | -1 | -1 | 1  | 1  | 1  | -1 |
| 15 | 1  | 1  | -1 | -1 | -1 | -1 | 1  | 1  | -1 | -1 | 1  | 1  | 1  | 1  | -1 | -1 |

| S | $b_{s,0}, b_{s,1} \ldots, b_{s,31}$ | | | | | | | | | | | | | | | |
|---|---|---|---|---|---|---|---|---|---|---|---|---|---|---|---|---|
| 0  | 1  | 1  | 1  | 1  | 1  | 1  | 1  | 1  | 1  | 1  | 1  | 1  | 1  | 1  | 1  | 1  |
| 1  | -1 | -1 | 1  | 1  | -1 | -1 | 1  | 1  | -1 | -1 | 1  | 1  | -1 | -1 | 1  | 1  |
| 2  | 1  | 1  | -1 | -1 | -1 | -1 | 1  | 1  | 1  | 1  | -1 | -1 | -1 | -1 | 1  | 1  |
| 3  | -1 | -1 | -1 | -1 | 1  | 1  | 1  | 1  | -1 | -1 | -1 | -1 | 1  | 1  | 1  | 1  |
| 4  | 1  | 1  | 1  | 1  | 1  | 1  | -1 | -1 | -1 | -1 | -1 | -1 | -1 | -1 | -1 | -1 |
| 5  | -1 | -1 | 1  | 1  | -1 | -1 | -1 | -1 | 1  | 1  | -1 | -1 | 1  | 1  | 1  | 1  |
| 6  | 1  | 1  | -1 | -1 | -1 | -1 | -1 | -1 | -1 | -1 | 1  | 1  | 1  | 1  | 1  | 1  |
| 7  | -1 | -1 | -1 | -1 | 1  | 1  | -1 | -1 | 1  | 1  | 1  | 1  | -1 | -1 | 1  | 1  |
| 8  | -1 | -1 | -1 | -1 | -1 | -1 | -1 | -1 | -1 | -1 | -1 | -1 | -1 | -1 | -1 | -1 |
| 9  | 1  | 1  | -1 | -1 | 1  | 1  | -1 | -1 | 1  | 1  | -1 | -1 | 1  | 1  | -1 | -1 |
| 10 | -1 | -1 | 1  | 1  | 1  | 1  | -1 | -1 | -1 | -1 | 1  | 1  | 1  | 1  | 1  | 1  |
| 11 | 1  | 1  | 1  | 1  | -1 | -1 | -1 | -1 | 1  | 1  | 1  | 1  | -1 | -1 | 1  | 1  |
| 12 | -1 | -1 | -1 | -1 | -1 | -1 | 1  | 1  | 1  | 1  | 1  | 1  | 1  | 1  | 1  | 1  |
| 13 | 1  | 1  | -1 | -1 | 1  | 1  | 1  | 1  | -1 | -1 | 1  | 1  | -1 | -1 | 1  | -1 |
| 14 | -1 | -1 | 1  | 1  | 1  | 1  | 1  | 1  | 1  | 1  | -1 | -1 | -1 | -1 | 1  | 1  |
| 15 | 1  | 1  | 1  | 1  | -1 | -1 | 1  | 1  | -1 | -1 | -1 | -1 | 1  | 1  | 1  | 1  |

Adding AICH bits along bit positions $b_{s,0}, b_{s,1} \ldots, b_{s,31}$ (where $b_{s,0}$ is the first column of all "1's", $b_{s,1}$ is the second column of all "1's", etc.) for different numbers of signature sequences produces the amplitude results shown in Table 2 below.

Required *AICH* transmit Power (dBm)=$CPICH_{power}$ (dBm)+$AICH_{relative\_power}$(dBm)+20*log 10(Abs (Table 2)) (1)

The absolute value term Abs(Table 2) is the absolute value of the difference between the sum of all positive acknowledgements on the AICH and the sum of all negative acknowledgements on the AICH. A negative acknowledgement is the same signature pattern as a positive acknowledgement but inverted.

TABLE 2

Different Combinations of AICH signature patterns added

| Σ | $b_{s,0}, b_{s,1} \ldots, b_{s,31}$ | | | | | | | | | | | | | | | |
|---|---|---|---|---|---|---|---|---|---|---|---|---|---|---|---|---|
| 0-3  | 4  | 4  | 0 | 0 | 0 | 0 | 0 | 0 | 4 | 4 | 0  | 0  | 0  | 0  | 4  | 4  |
| 0-4  | 5  | 5  | 1 | 1 | 1 | 1 | 1 | 1 | 3 | 3 | -1 | -1 | -1 | -1 | 3  | 3  |
| 0-7  | 8  | 8  | 0 | 0 | 0 | 0 | 0 | 0 | 0 | 0 | 0  | 0  | 0  | 0  | 8  | 8  |
| 0-15 | 16 | 16 | 0 | 0 | 0 | 0 | 0 | 0 | 0 | 0 | 0  | 0  | 0  | 0  | 0  | 0  |

| Σ | $b_{s,0}, b_{s,1} \ldots, b_{s,31}$ | | | | | | | | | | | | | | | |
|---|---|---|---|---|---|---|---|---|---|---|---|---|---|---|---|---|
| 0-3  | 0 | 0 | 0 | 0 | 0 | 0 | 4 | 4 | 0  | 0  | 0  | 0  | 0  | 0 |
| 0-4  | 1 | 1 | 1 | 1 | 1 | 1 | 3 | 3 | -1 | -1 | -1 | -1 | -1 | -1 |
| 0-7  | 0 | 0 | 0 | 0 | 0 | 0 | 0 | 0 | 0  | 0  | 0  | 0  | 0  | 0 |
| 0-15 | 0 | 0 | 0 | 0 | 0 | 0 | 0 | 0 | 0  | 0  | 0  | 0  | 0  | 0 |

The power in dBm required from the base station to transmit the AICH acknowledgements for different combinations of AICH signatures transmitted during the same AICH time slot may be determined using the following equation:

In the case where there is a different power level for a positive acknowledgement as compared to negative acknowledgement, then a factor should be multiplied to the sum of the negative acknowledgements to compensate for the different power levels. Of course, if there is no power level difference between positive and negative acknowledgements, that factor will be 1. Table 3 below illustrates the required AICH transmit power in dBm units (20*log 10) below.

TABLE 3

AICH signature power needed in dBm

| Σ | Power in dB for bits $b_{s,0}, b_{s,1} \ldots, b_{s,31}$ | | | | | | | | | | | | | | | | | | | |
|---|---|---|---|---|---|---|---|---|---|---|---|---|---|---|---|---|---|---|---|---|
| 0-3 | 12 | 12 | — | — | — | — | — | — | 12 | 12 | — | — | — | — | — | — | — | — | 12 | 12 |
| 0-4 | 14 | 14 | 0 | 0 | 0 | 0 | 0 | 0 | 9.5 | 9.5 | 0 | 0 | 0 | 0 | 0 | 0 | 9.5 | 9.5 |
| 0-7 | 18 | 18 | — | — | — | — | — | — | — | — | — | — | — | — | — | — | 18 | 18 |
| 0-15 | 24 | 24 | — | — | — | — | — | — | — | — | — | — | — | — | — | — | — | — |

| Σ | Power in dB for bits $b_{s,0}, b_{s,1} \ldots, b_{s,31}$ | | | | | | | | | | | | | |
|---|---|---|---|---|---|---|---|---|---|---|---|---|---|---|---|
| 0-3 | — | — | — | — | — | — | — | — | — | — | — | — | — | — |
| 0-4 | 0 | 0 | 0 | 0 | 0 | 0 | 0 | 0 | 0 | 0 | 0 | 0 | 0 | 0 |
| 0-7 | — | — | — | — | — | — | — | — | — | — | — | — | — | — |
| 0-15 | — | — | — | — | — | — | — | — | — | — | — | — | — | — |

The $CPICH_{power}$ is the maximum transmit power over the common pilot indication channel (CPICH) transmitted by each base station. As one non-limiting example, assume that the $CPICH_{power}$ is set at level of −10 dB relative to the base station downlink maximum available power. The $AICH_{relative\_power}$ is assumed in this example to be set at −5 dB relative to the $CPICH_{power}$ of −10 dB relative to the base station downlink maximum available power. This means that if the base station sends out signature sequences 0-7 during the same AICH time slot, then the base station transmitter needs [−10−5+18]=3 dB more power than the maximum permitted power for the first and second signature bit positions. Combining signatures 0-15 at the same time means that the base station must transmit at [−10−5+24]=9 dB more power than the maximum permitted power for both the first and second bit positions of the signature.

These kinds of excess power requirements can damage the base station power amplifier even if there is a power limiting function. This is due to the fact that the excess access power is required for the two consecutive AICH bits=256 chips (1 AICH signature bit=128 chips). A peak power limiter in the base station operates only on two chips out of the entire 20 ms time frame, and a mean power limiter in the base station work on slot time frame (256 chips).

By way of additional background relating to base station power limiters, modern base stations normally use these two types of power limiters. A peak power limiter limits the power when power peaks have a width of just a few chips but not when peaks extend for a longer time. Without a peak limiter, the power amplifiers in the base station would need to be over dimensioned. A mean power limiter is activated if the power over a much longer time slot (e.g., a slot containing 2560 chips) is too high. A mean limiter is normally activated when the transmit power level is 1-2 dB over a specified maximum power level (as compared for a peak limiter to 7-8 dB over the specified maximum power level) in order to not overheat the power amplifier and stress the base station cooling system. Nevertheless, these limiters do not solve the problems identified in the background section.

One way to avoid this situation is to prohibit the base station from sending out too many AICH acknowledgement messages during the same access time slot. This approach may be satisfactory when the load on the AICH channel is moderate or low. But for higher AICH load situations, simply limiting the number of AICH transmissions per access time slot may not be a desirable option because it would reduce the throughput of the RACH/CPCH channel. Some users may also be left without a response from the base station causing them to continue ramping up power and sometimes increasing the delay (latency).

A better approach is to selectively power limit the AICH signature sequences. One example, non-limiting methodology for doing this is now described in conjunction with the AICH Power Control flow chart shown in FIG. 4. The power level required to transmit multiple signature or other bit/symbol sequences during the same or overlapping time periods is monitored in step S1. To simplify terminology, it will be understood that "during the same time period" includes simultaneous transmission of multiple sequences as well as overlapping transmissions of multiple sequences. It will also be understood that although signature sequence is used in the context of AICH/RACH signature sequence of symbols or bits, the term "signature sequence" includes any type of bit or symbol sequence.

The voltage levels or other amplitude values at aligned symbol or bit positions of the overlapping sequences are combined, e.g., added. Those first sequence positions having a combined value greater than a maximum permitted or desired value (corresponding to or associated with a maximum AICH power level) are determined (step S2). The combined voltage or other signal level(s) of the first sequence bit positions exceeding a predetermined maximum value is(are) reduced in order to keep the transmitted power at those positions below the predetermined maximum (step S3).

A downside with lowering the power at which the combined voltage or other signal level values of the first sequence bit or symbol positions are transmitted is that the likelihood that the values at these first bit positions will be received accurately by the mobile stations at the lower power is reduced. To compensate for this decrease in accuracy, another optional but desirable feature is to increase the power of values at second bit/symbol positions in the signature sequence different from the first bit positions (step S4). That way, the receiver has a higher probability of receiving the values at these second bit/symbol positions in the signature sequence accurately to offset the lower probability of accurate reception of the values at the first sequence bit positions.

A further desirable feature is to then check if the combined signal voltage levels or other amplitude values at the second symbol or bit positions of the overlapping exceeds the maximum permitted or desired value (step S5). The combined voltage or other signal level(s) of the second sequence bit or symbol positions exceeding a predetermined maximum value is(are) reduced in order to keep the transmitted power at those positions below the predetermined maximum (step S6). This procedure may be repeated multiple times.

Figure 4:
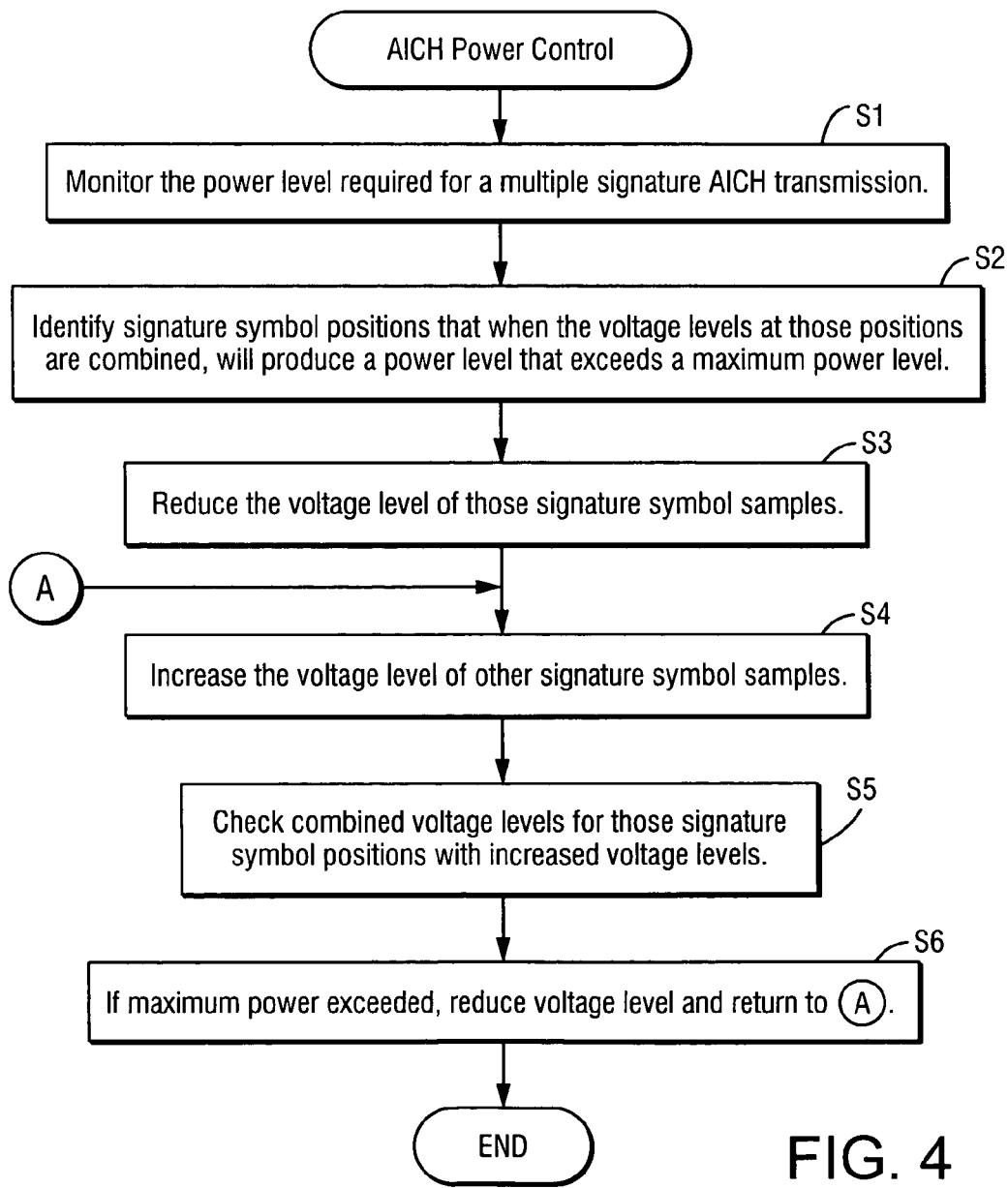
FIG. 4 is a flowchart diagram illustrating example, non-limiting steps to control the AICH transmission power level.
Figure 5:
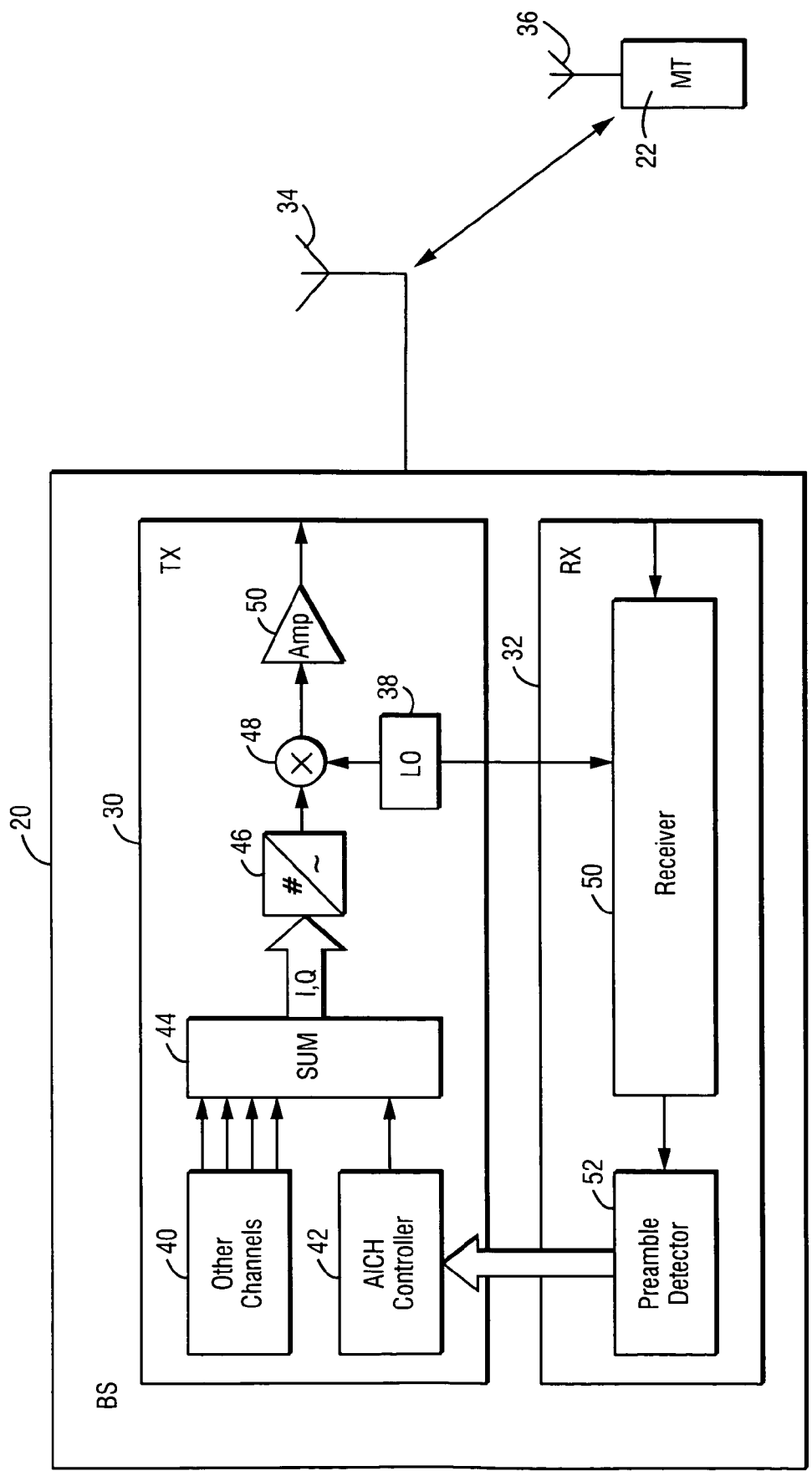
FIG. 5 is a function block diagram of a base station that may be used to receive transmissions from multiple mobile terminals and acknowledge them in a single slot using an message sent over the AICH.

FIG. 5 shows a non-limiting example of a base station that could implement the AICH power limiting procedures outlined in FIG. 4. The base station 20 receives a high load of RACH signals from multiple mobile terminals 22 (having corresponding antennas 36), and in response, transmits via antenna 34 multiple corresponding AICH acknowledgements during a same AICH access time slot. The base station 20 includes a transmitter 30 and a receiver 32. The transmitter 30 includes an AICH controller 42 which provides weighted AICH signals for transmission to a summer 44. Other channel information 40 (such as dedicated channels and other common channels) is also combined in the summer 44 for transmission over appropriate downlink channels. The summed signal, including real (I) and imaginary (Q) components, is provided to a controller 46 that performs among other things analog-to-digital conversion. The weighted signal is frequency upconverted in a mixer 48 using a local oscillator 38 input signal. The RF signal is amplified in power amplifier 50 and transmitted over the air interface via the antenna 34 over an appropriate channel. The receiver 32 includes receiving circuitry 50 for filtering and frequency downconverting the received RF signal at the antenna 34. The received signal is then processed by a preamble detector 52 which extracts information about the preamble of the received signals, which in the non-limiting example corresponds to a RACH signature sequence of bits or symbols for each mobile signal received. As explained in more detail in conjunction with FIG. 6, the preamble detector 52 detects and provides to the AICH controller 42 the RACH signature included in the RACH transmission received over the base station's RACH from the mobile terminal.

One example AICH power control method is now described for purposes of illustration and not limitation. First, the power required to transmit each bit position in the combined AICH signature sequence is compared with maximum available downlink power, e.g., −5 dB. Second, for those bit positions that exceed the maximum available power, the AICH power profile is power limited by reducing the weighting applied to those positions. Third, for one or more other AICH bit positions that are below the maximum, the weighting is increased to compensate for the lost power in the clipped AICH bit positions. Fourth, if the increased compensation power causes other bit positions to exceed the AICH maximum power level, the weights for those bit positions are also reduced. The goal here is to maintain the total over all or integrated power for the AICH signature so that system performance is not adversely affected while at the same time making sure that the power amplifier does not require too much power. This process may be repeated.

Figure 6:
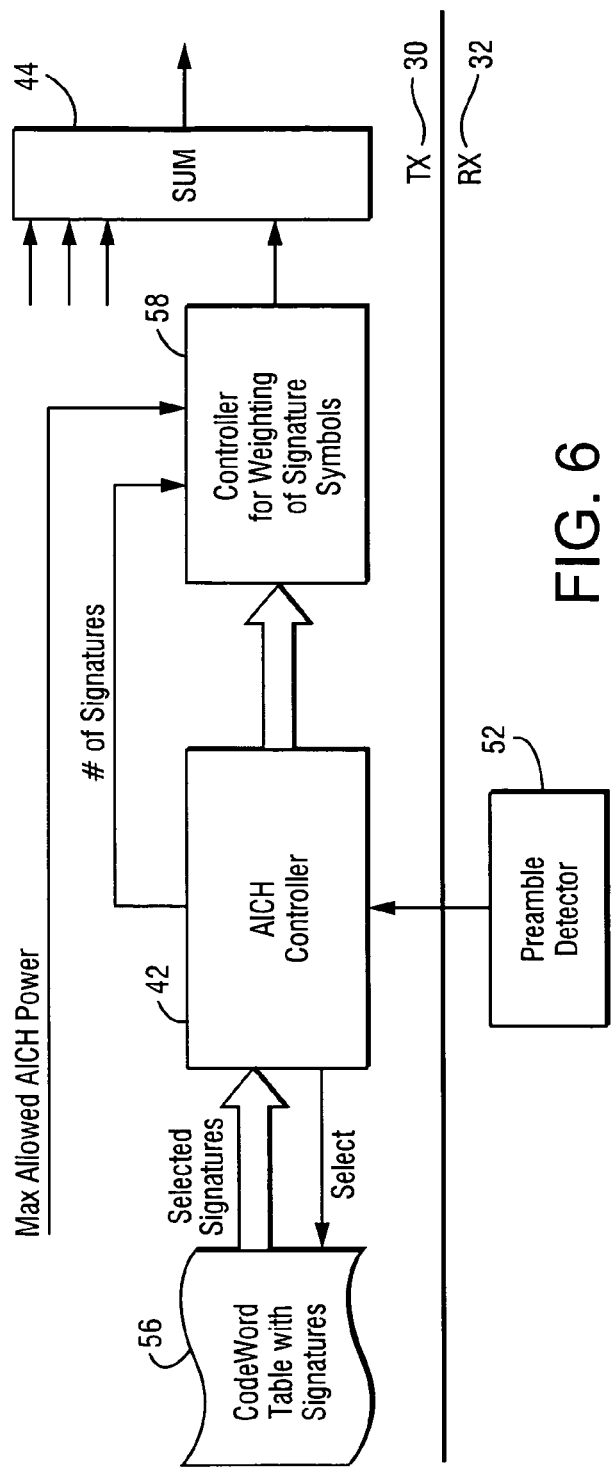
FIG. 6 is a function block diagram illustrating one non-limiting example way to implement power control on one or more selected bits transmitted over the AICH.

FIG. 6 illustrates details of one non-limiting example way of adjusting the AICH profile. A codeword table memory 56 stores a set of AICH signatures that correspond to RACH signatures that may be received from mobile terminals over the base station's RACH. Depending on the RACH signature detected by the preamble detector 52 in the received RACH message from a mobile terminal, the AICH controller 42 sends a selection signal or address to the table 56 and retrieves the corresponding AICH signature sequence. Since multiple mobile terminals may send RACH messages that simultaneously require an acknowledgement on the AICH, the AICH controller provides the number AICH signatures being combined for transmission in a single AICH access time slot to controller 58. The number of AICH signatures indicates how much power will be required. A maximum allowed AICH power is also provided to the controller 58. The signature sequence weighting controller 62 weights the signature bit values for one or more bit positions of the combined signatures and sends the weighted signature sequence to the summer 44.

A non-limiting implementation algorithm for weighting the combined AICH signatures is set forth below in pseudo-code for the example in which the combined power for signature bit positions 0 and 1 exceeds a predetermined maximum. Explanatory comments are provided in brackets after the pseudo-code lines. The term WeightingBit [dB] corresponds to each bit position of the combined signature sequence.

Power(dBm)=CPICH$_{power}$[dBm]+AICH$_{relative\_power}$[dB]+20*log 10(Abs(Table 2))[dB]

[This formula estimates the power level if all the AICH messages are sent in the same time frame.]

WeightingBit[dB]=Power[dBm]−maxAllowedAICHPower [dBm]

[Define the weighting bit.]

if WeightingBit>0 dB

[Determine if the WeightingBit exceeds a predetermined limit, which in this example is 0 dB.]

then do for bit Nbit=[0, 1]
    AICH(Nbit)=AICH(Nbit)−WeightingBit(Nbit)

[If the limit is exceeded, then the power is reduced for AICH bits 0 and 1.]

then do for bit Nbit=[2-31]
    AICH(Nbit)=AICH(Nbit)+10*log 10 (1+((10^(WeightingBit/10)−1)/15))

[Then for the rest of the bits, the power is increased for AICH bits 2-31.]

fi

[Finish.]

Figure 7:
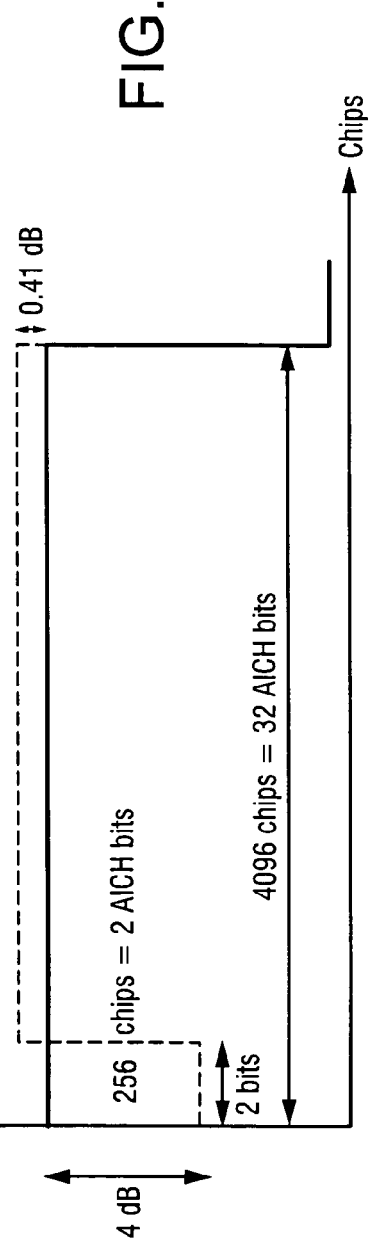
FIG. 7 is a graph illustrating one example using the example approach illustrated in FIG. 6.

FIG. 7 illustrates an AICH power profile adjustment using this power control algorithm. A combined AICH signature sequence combines AICH signatures 0-4 from Tables 1-3 above. The power needed for the first two AICH bits 0 and 1 is: 10−5+14=−1 dB. But this power requirement is 4 dB more than the predetermined AICH power clipping level of 5 dB below the maximum available power. The power level of the first two bit positions is reduced by 4 dB as shown in FIG. 7. To compensate, the other 30 signature sequence bits (30 bits compared with 2 bits results in a factor of 15) should have an AICH power of 10*log 10(1+((10^(4/10)−1)/15))=0.41 dB. This corresponds to a 0.01 dB power increase spread across those 30 bits than before the adjustment and is shown in FIG. 7.

Accordingly, the power limiting functions described above reduce the demand on the base station power amplifier when the RACH and/or AICH or similar channel is loaded. Introducing such a power limiter protects the base station power amplifier, increases the capacity of the RACH/AICH/other channels, and ultimately enhances further development of the cellular communications system.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC § 112 unless the words "means for" are used.

The invention claimed is:

1. A method for controlling a power level of radio transmissions from a base station, comprising:
   receiving multiple first signals from multiple mobile terminals over a first radio channel;
   generating multiple second signals for transmission by the base station over a second radio channel during a same time interval, each second signal being responsive to one of the mobile terminals and including a sequence of bits associated with that mobile terminal;
   combining the sequences of bits to generate a total value for one or more first bit positions in the sequences;
   determining that the total value for the one or more first bit positions in the sequences exceeds a predetermined maximum transmission power parameter;
   selectively reducing a transmission power level associated with the one or more first bit positions in the sequences; and
   thereafter, transmitting the second signals over a second radio channel.

2. The method in claim 1, further comprising:
   increasing a transmission power level associated with one or more second bit positions in the sequences.

3. The method in claim 2, further comprising:
   determining that the total value for the one or more second bit positions in the sequences exceeds the predetermined maximum transmission power parameter;
   selectively reducing a transmission power level associated with the one or more second bit positions in the sequences; and
   increasing a transmission power level associated with one or more third bit positions in the sequences.

4. The method in claim 1, wherein each sequence of bits corresponds to a signature sequence of bits.

5. The method in claim 4, wherein the second radio channel is an acquisition indication channel (AICH) and the second signals are acquisition indication signals acknowledging the first signals, the method further comprising:
   determining the signature sequence of bits for each mobile terminal based on a signature sequence received from that mobile terminal.

6. The method in claim 5, wherein the first channel is a random access channel (RACH) or a common packet channel (CPCH).

7. The method in claim 5, wherein the same time period is an AICH time slot.

8. The method in claim 5, wherein the decreasing includes reducing a weighting applied to the transmission power level associated with the one or more first bit positions in the sequences.

9. Apparatus for controlling a power level of radio transmissions from a base station, comprising:
   a receiver for receiving multiple first signals from multiple mobile terminals over a first radio channel;
   control circuitry coupled to the receiver and configured to:
      generate multiple second signals for transmission by the base station over a second radio channel during a same time interval, each second signal being responsive to one of the mobile terminals and including a sequence of bits associated with that mobile terminal;
      combine the sequences of bits to generate a total value for one or more first bit positions in the sequences;
      determine that the total value for the one or more first bit positions in the sequences exceeds a predetermined maximum transmission power parameter;
      selectively reduce a transmission power level associated with the one or more first bit positions in the sequences; and
   a transmitter for transmitting the second signals over a second radio channel after the second signals has been processed by the controller.

10. The apparatus in claim 9, wherein the controller is further configured to:
    increase a transmission power level associated with one or more second bit positions in the sequences.

11. The apparatus in claim 10, wherein the controller is further configured to:
    determine that the total value for the one or more second bit positions in the sequences exceeds the predetermined maximum transmission power parameter;
    selectively reducing a transmission power level associated with the one or more second bit positions in the sequences; and
    increasing a transmission power level associated with one or more third bit positions in the sequences.

12. The apparatus in claim 9, wherein each sequence of bits corresponds to a signature sequence of bits.

13. The apparatus in claim 12, wherein the second radio channel is an acquisition indication channel (AICH) and the second signals are acquisition indication signals acknowledging the first signals, the controller being further configured to:
    determine the signature sequence of bits for each mobile terminal based on a signature sequence received from that mobile terminal.

14. The apparatus in claim 13, wherein the first channel is a random access channel (RACH) or a common packet channel (CPCH).

15. The apparatus in claim 13, wherein the same time period is an AICH time slot.

16. The apparatus in claim 13, wherein the controller is further configured to:
    reduce a weighting applied to the transmission power level associated with the one or more first bit positions in the sequences.

* * * * *

UNITED STATES PATENT AND TRADEMARK OFFICE
CERTIFICATE OF CORRECTION

PATENT NO. : 7,586,865 B2  Page 1 of 1
APPLICATION NO. : 11/472552
DATED : September 8, 2009
INVENTOR(S) : Ostman et al.

It is certified that error appears in the above-identified patent and that said Letters Patent is hereby corrected as shown below:

On the Title Page, in Item (56), under "OTHER PUBLICATIONS", in Column 2, Line 7, delete "2003)" and insert -- 2006), --, therefor.

On the Title Page, in Item (57), under "ABSTRACT", in Column 2, Line 12, after "of" delete "the".

In Column 10, Line 20, delete "AICHPower" and insert -- $AICH_{power}$ --, therefor.

Signed and Sealed this

Nineteenth Day of January, 2010

David J. Kappos
*Director of the United States Patent and Trademark Office*